(12) United States Patent
Dragomir et al.

(10) Patent No.: US 8,535,415 B2
(45) Date of Patent: Sep. 17, 2013

(54) REFINERY GAS UPGRADING VIA PARTIAL CONDENSATION AND PSA

(75) Inventors: Ramona Manuela Dragomir, The Woodlands, TX (US); Raymond Francis Drnevich, Clarence, NY (US); Dante Patrick Bonaquist, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 13/571,801

(22) Filed: Aug. 10, 2012

(65) Prior Publication Data

US 2012/0304688 A1    Dec. 6, 2012

Related U.S. Application Data

(63) Continuation of application No. 12/515,181, filed as application No. PCT/US2007/086488 on Dec. 5, 2007, now Pat. No. 8,262,772.

(60) Provisional application No. 60/872,919, filed on Dec. 5, 2006.

(51) Int. Cl.
*B01D 53/047* (2006.01)
*C01B 3/50* (2006.01)

(52) U.S. Cl.
USPC .................................. 95/96; 95/143; 62/617

(58) Field of Classification Search
USPC ................. 95/96, 143; 96/121; 62/617, 618, 62/636
See application file for complete search history.

(56) References Cited

U.S. PATENT DOCUMENTS

| | | | |
|---|---|---|---|
| 3,223,745 A | 12/1965 | Davison | |
| 3,359,744 A | 12/1967 | Bolez et al. | |
| 3,628,340 A | 12/1971 | Meisler et al. | |
| 3,691,779 A | 9/1972 | Meisler et al. | |
| 3,796,059 A | 3/1974 | Banikiotes et al. | |
| 3,838,553 A | 10/1974 | Doherty | |
| 4,043,770 A | 8/1977 | Jakob | |
| 4,242,875 A | 1/1981 | Schaefer | |
| 4,443,238 A | 4/1984 | Beddone et al. | |
| 4,482,369 A | 11/1984 | Carson et al. | |
| 4,547,205 A | 10/1985 | Steacy | |
| 4,617,039 A | 10/1986 | Buck | |
| 4,732,596 A | 3/1988 | Nicholas et al. | |
| 4,749,393 A | 6/1988 | Rowles et al. | |
| 4,756,730 A | 7/1988 | Stupin | |
| 6,159,272 A | 12/2000 | Baker et al. | |
| 6,560,989 B1 | 5/2003 | Roberts et al. | |
| 6,931,889 B1 | 8/2005 | Foglietta et al. | |
| 7,402,287 B2 | 7/2008 | Wheat et al. | |

FOREIGN PATENT DOCUMENTS

WO    WO 03/051482 A2    6/2003

*Primary Examiner* — Frank Lawrence, Jr.
(74) *Attorney, Agent, or Firm* — Iurie A. Schwartz

(57) ABSTRACT

A process and system for recovering valuable by-products (e.g., hydrogen) from refinery gas streams. For hydrogen-only recovery, the invention comprises a partial condensation step to upgrade the refinery fuel gas to a minimum of 60% hydrogen, which is further purified in a pressure swing adsorption process. When configured to recover hydrogen, methane-rich gas and raw LPG (methane depleted gas containing C2 hydrocarbons and heavier), the invention comprises two partial condensation steps where the feed is cooled in the first step to allow separation of ethane and heavier hydrocarbons, and the resulting vapor is cooled to a lower temperature in a second step for hydrogen recovery.

5 Claims, 3 Drawing Sheets

REFINERY GAS UPGRADING VIA PARTIAL CONDENSATION AND PSA

RELATED APPLICATIONS

This application is a continuation of prior U.S. application Ser. No. 12/515,181, filed Jan. 12, 2010 now U.S. Pat. No. 8,262,772, which claims priority from International Application No. PCT/US07/086,488, filed Dec. 5, 2007, which claims priority from U.S. Provisional Application Ser. No. 60/872,919, filed Dec. 5, 2006, which is incorporated herein by reference.

TECHNICAL FIELD

The present invention relates generally to the recovery of valuable by-products from refinery gas streams, such as hydrogen.

BACKGROUND ART

The petroleum industry has often sought new integration opportunities for its refinery products with other processes. One of the areas of interest concerns refinery gases that are currently used as a fuel. In addition, refineries are processing heavier crude oils and sulfur specifications for both diesel and gasoline products are becoming more stringent. Hydrogen can be used within hydrotreaters to remove sulfur, oxygen, and nitrogen and also within hydrocrackers to produce lighter and more parafinic oils. Consequently, refineries are looking for low cost sources of hydrogen.

While the refinery gases are a potential source of hydrogen, many refinery gas streams are not used either for their hydrogen content or to generate hydrogen through known reforming techniques due to a variety of economic and practical reasons. For instance, the economics for separating hydrogen from refinery gases that contain less than about 30% hydrogen are generally unfavorable. Generally, the hydrogen concentration within such refinery off-gases is too low for the hydrogen to be economically recovered using current available separation technologies.

Several processes are known in the art for the separation and recovery of hydrogen from hydrogen-hydrocarbon feed gas streams. Among these are the following:

U.S. Pat. No. 3,838,553 (Doherty) describes a combination pressure swing adsorption (PSA) and cryogenic process to recover a light gas, especially hydrogen or helium, at high purity and at high recovery from a multicomponent gaseous mixture. The process described by Doherty utilizes both a low temperature separator unit (LTU) and a pressure swing adsorber with recompression of the regeneration stream from the latter and recycle of the recompressed stream to the LTU. However, Doherty requires upgrading the hydrogen stream to at least 95% hydrogen prior to PSA purification. Also, Doherty teaches the recycling of the PSA tailgas, which is uneconomical for PSAs with reasonable recovery (e.g., higher than 80%) due to high compression costs. Furthermore, Doherty does not consider the recovery of heavy hydrocarbons (ethane and heavier).

U.S. Pat. No. 3,691,779 (Meisler et al.) describes a process consisting of a low temperature refrigeration unit and a PSA for producing a high purity, 97 to 99.9% hydrogen. The hydrogen-rich feed, containing methane, nitrogen, carbon monoxide and traces of argon, oxygen, carbon dioxide and light hydrocarbons, passes through a series of cooling and condensation stages having successively lower temperatures, the lowest being −340° F. (120° R). Hydrogen containing vapors and condensate are separated between cooling stages. The hydrogen-enriched gas is sent for further upgrading to an adsorption system operating between −260 to −320° F. (200 to 140° R). A portion of the upgraded stream is expanded, passed through at least one refrigeration stage to provide refrigeration, and then used for regeneration in the PSA system. Most of the refrigeration is provided by Joule-Thomson expansion of the condensates. Meisler et al. teach the use of a capital intensive system, due to the multiple steps required for refrigeration in order to upgrade the feed to approximately 97% hydrogen before sending to PSA. Meisler et al. also teach very low temperature levels in the cold box, driven mostly by the amount of non-condensable compounds present in the feed and the high purity required for the hydrogen stream.

U.S. Pat. No. 7,041,271 (Drnevich et al.) discloses an integrated method for olefins recovery and hydrogen production from a refinery off-gas. After conventional pretreatment, the refinery gas is separated to obtain a light ends stream containing hydrogen, nitrogen and methane, and a heavy ends stream containing olefins. The light ends stream is mixed with natural gas and subjected to reforming and water gas shift reactions for hydrogen production. The heavy ends can be further processed for olefin recovery, such as ethylene and propylene. Drnevich et al. teach the recovery one light end stream from the refinery off-gas. Also, the present invention does not consider the further processing of $C_2+$ hydrocarbon stream for olefin/liquefied petroleum gas (LPG) recovery. Furthermore, Drnevich et al. teach the use of low temperature distillation, membrane, PSA and adsorption-desorption processes as means for light end separation, but partial condensation is not discussed.

U.S. Pat. No. 4,749,393 (Rowles et al.) describes a hybrid gas separation process which recovers both heavy hydrocarbon (C2+, C3+ or C4+) and high purity hydrogen products from a gas containing a relatively low concentration of hydrogen (<40%). The process comprises a warm heat exchanger where the feed (together with recycle from the hydrogen purifier) is cooled to an intermediate temperature to allow the recovery of heavy hydrocarbons, a separator coupled with a dephlegmator (reflux condenser) for enriching the heavy hydrocarbons condensate, and a cold heat exchanger followed by a separator, from which an enriched hydrogen gas is obtained and, after warming to recover the refrigeration, is sent to the hydrogen purifier (e.g., PSA, membrane). An optional turboexpander or compressor (depending on the hydrogen purifier requirements) can be added on the hydrogen-enriched stream. The condensate from the cold end separator, rich in methane (80-85%) is used to generate the refrigeration through Joule-Thomson expansion and then is sent to fuel. Additional refrigeration is generated by Joule-Thomson expansion of the condensate from the warm end separator/dephlegmator. The tailgas from the hydrogen purifier (PSA) is recycled to the feed, which can be uneconomical due to recompression requirements. In addition, the use of the dephlegmator for enriching the hydrocarbon condensate can be expensive.

As will be discussed, the present invention provides a process for recovering valuable products, especially hydrogen, from refinery fuel gases in order to economically and practically produce such products and increase efficiency and lower costs.

SUMMARY OF THE INVENTION

The present invention relates to a process and system for recovering high purity hydrogen and optionally one or more hydrocarbon-rich products from a feed gas containing less than 50 mole % hydrogen via partial condensation in an auto-refrigeration cold box and PSA. The process can be used stand-alone, only for hydrogen recovery, or can be modified to allow the recovery of other valuable by-products such as methane-rich gas and raw LPG (methane depleted gas containing ethane and heavier hydrocarbons, usually used as feedstock for LPG recovery). In the stand-alone process, the feed is compressed, treated for water and impurities removal, cooled in a cold box and then sent to a separator. The separator liquid is used to provide refrigeration through Joule-Thomson expansion and, after warming in the heat exchanger against the incoming feed, is sent to fuel. The high pressure vapor from the separator, containing at least 60% hydrogen, is warmed against the incoming feed and sent to PSA for purification. The PSA tailgas is sent to fuel after recompression.

In another embodiment of the invention, the feed, after compression and treatment, is cooled in two stages. After the first cooling stage (warm end heat exchanger) the feed is separated at high pressure and a temperature chosen such as to maximize the recovery of the C2+ hydrocarbons in the liquid phase. The gas phase is sent to a second cooling stage (cold end heat exchanger), and then separated into a hydrogen-rich stream containing at least 60% hydrogen and a liquid containing at least 70% methane. The condensate, after Joule-Thomson expansion to provide refrigeration and warming in the cold end heat exchanger, is used as stripping gas in a low pressure wash column, to enhance hydrocarbon recovery in the condensate. The hydrogen-rich vapor is warmed against incoming feed in both cold end and warm end heat exchangers and then sent to PSA for purification. The PSA tailgas is sent, after recompression, to fuel. Wash column vapor product is, after warming against incoming feed, sent to fuel or, after further compression and cooling, sent as SMR feed. The liquid product from the wash column is, after warming against incoming feed, sent to further processing for LPG recovery.

Compared to the prior art, the present invention is more efficient. For example, Doherty teaches that the hydrogen stream must be at 95% prior to PSA purification, whereas the present invention requires only around 60% hydrogen. The present invention also uses a wash column for recovering C2+ hydrocarbons from the gaseous phase. Using the wash column arrangement, a simpler configuration is used to obtain basically the same quality products, leading to lower capital costs. As compared to the invention of Drnevich et al., the present invention separates two light end streams, a low pressure methane-rich stream, which is blended with natural gas and sent as feed to a steam methane reformer (SMR) and a hydrogen-rich stream at high pressure, which can be fed directly to the PSA. This allows for more flexibility in blending in order to meet certain requirements for SMR feed. For example, the hydrogen needs for the hydrotreating step can be satisfied by mixing a part of the hydrogen-rich stream with the SMR feed.

BRIEF DESCRIPTION OF THE DRAWINGS

While the specification concludes with claims distinctly pointing at the subject matter that applicants regards as their invention, it is believed that the invention will be better understood when taken in connection with the accompanying drawings:

DETAILED DESCRIPTION

The present invention relates to a process and system for recovering high purity hydrogen and optionally one or more hydrocarbon-rich product from a feed gas containing less than 50 mole % hydrogen via partial condensation in an auto-refrigeration cold box and PSA. The process can be used stand-alone, only for hydrogen recovery, or can be modified to allow the recovery of other valuable by-products such as methane-rich gas and raw LPG (methane depleted gases containing ethane and heavier hydrocarbons, usually used as feedstock for LPG recovery). As used herein, the percentage of hydrogen or other components may be expressed as "%" or "mole %". In the stand-alone process (FIG. 1), the feed is compressed, treated for water and impurities removal, cooled in a cold box and then sent to a separator. The separator liquid is used to provide refrigeration through Joule-Thomson expansion and, after warming in the heat exchanger against the incoming feed, is sent to fuel. The high pressure vapor from the separator, containing at least 60 mole % hydrogen, is warmed against the incoming feed and sent to PSA for purification. The PSA tailgas is sent to fuel after recompression.

In another embodiment of the invention (FIGS. 2 and 3) the feed, after compression and treatment, is cooled in two stages. After the first cooling stage (warm end heat exchanger) the feed is separated at high pressure and a temperature chosen such as to maximize the recovery of the C2+ hydrocarbons in the liquid phase. The gas phase is sent to a second cooling stage (cold end heat exchanger), and then separated into a hydrogen-rich stream containing at least 60% hydrogen and a liquid containing at least 70% methane. The condensate, after Joule-Thomson expansion to provide refrigeration and warming in the cold end heat exchanger, is used as stripping gas in a low pressure wash column, to enhance hydrocarbon recovery in the condensate. The hydrogen-rich vapor is warmed against incoming feed in both cold end and warm end heat exchangers and then set to PSA for purification. The PSA tailgas is sent, after recompression, to fuel. Wash column vapor product is, after warming against incoming feed, sent to fuel or, after further compression and cooling, sent as SMR feed. The liquid product from the wash column is, after warming against incoming feed, sent to further processing for LPG recovery.

Figure 1:
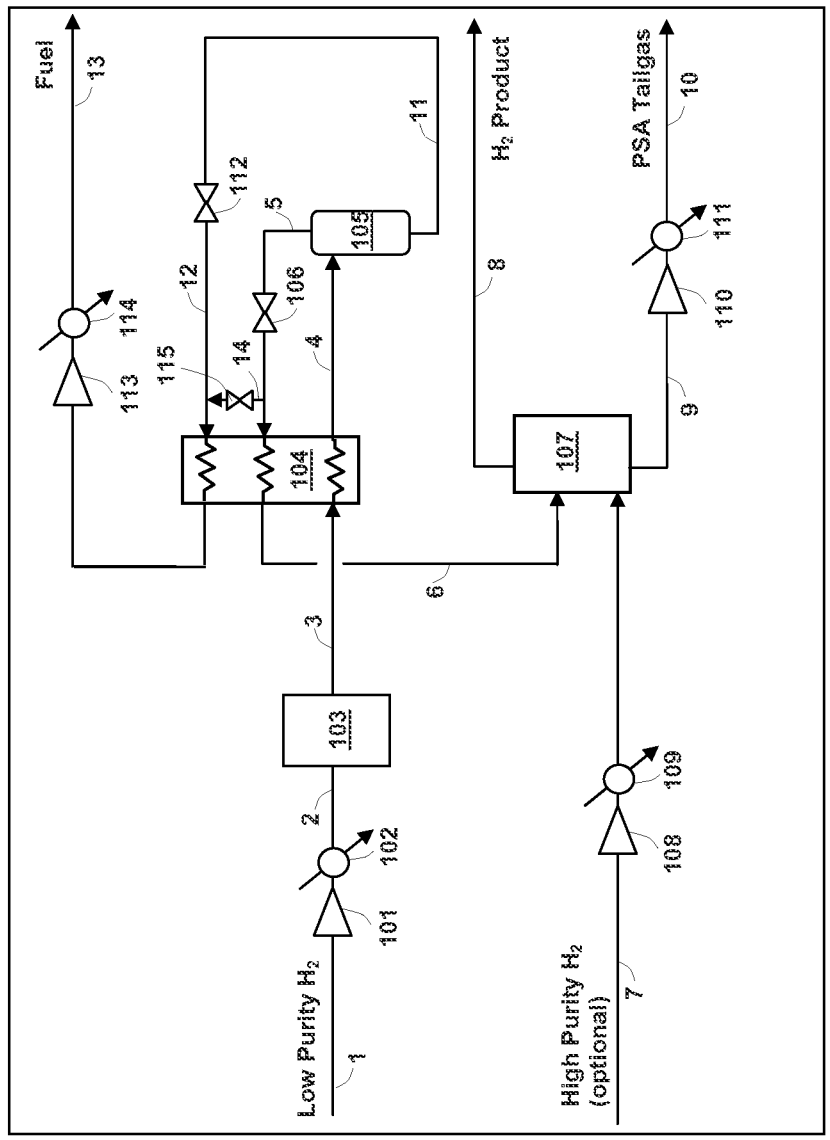
FIG. 1 is a schematic for an embodiment of the invention for the recovery of hydrogen.

One embodiment of the present invention is a process for recovering high purity hydrogen and optionally one or more hydrocarbon-rich products from a feed gas containing less than 50 mole % hydrogen, as represented by FIG. 1, comprising the following steps:

a) cooling a feed gas 1 in one or more heat exchangers and producing a partially condensed feed gas 4;

b) separating the partially condensed feed gas 4 to form a hydrogen-rich stream 5 and a hydrocarbon-rich stream 11;

c) generating refrigeration by Joule-Thomson expansion of the hydrocarbon-rich stream 11 and forming a colder hydrocarbon-rich stream 12;

d) recovering refrigeration from the colder hydrocarbon-rich stream 12 to cool the feed gas 1 in step (a);

e) recovering refrigeration from the hydrogen-rich stream 5 to cool the feed gas 1 in step (a);

f) recovering a gas stream 6 containing at least 60 mole % hydrogen from the hydrogen-rich stream 5; and g) feeding the gas stream 6 to a PSA system 107 and recovering high purity hydrogen product 8 with or without feeding an external hydrogen containing stream 7 to the PSA system.

Figure 2:
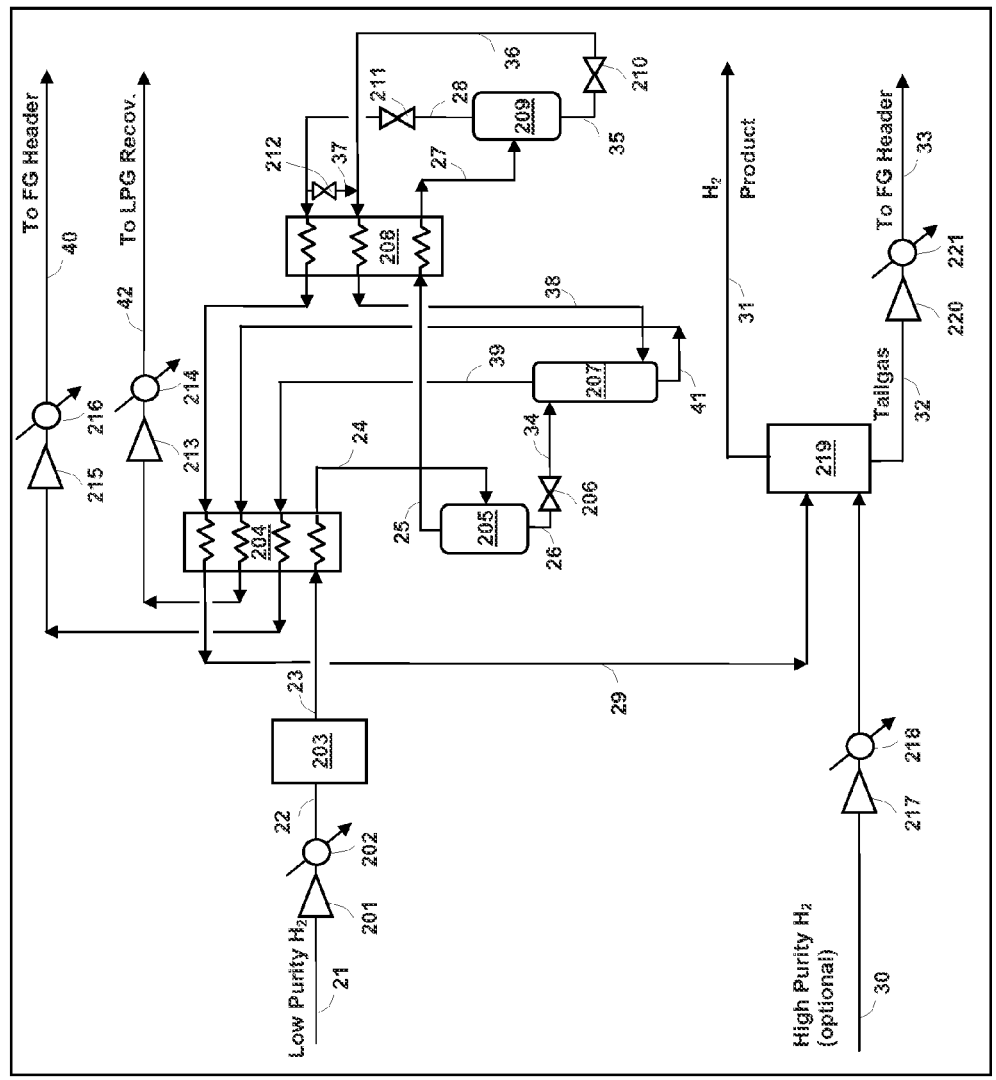
FIG. 2 is a schematic for an embodiment of the invention for the recovery of hydrogen, raw LPG and methane-rich gas.
Figure 3:
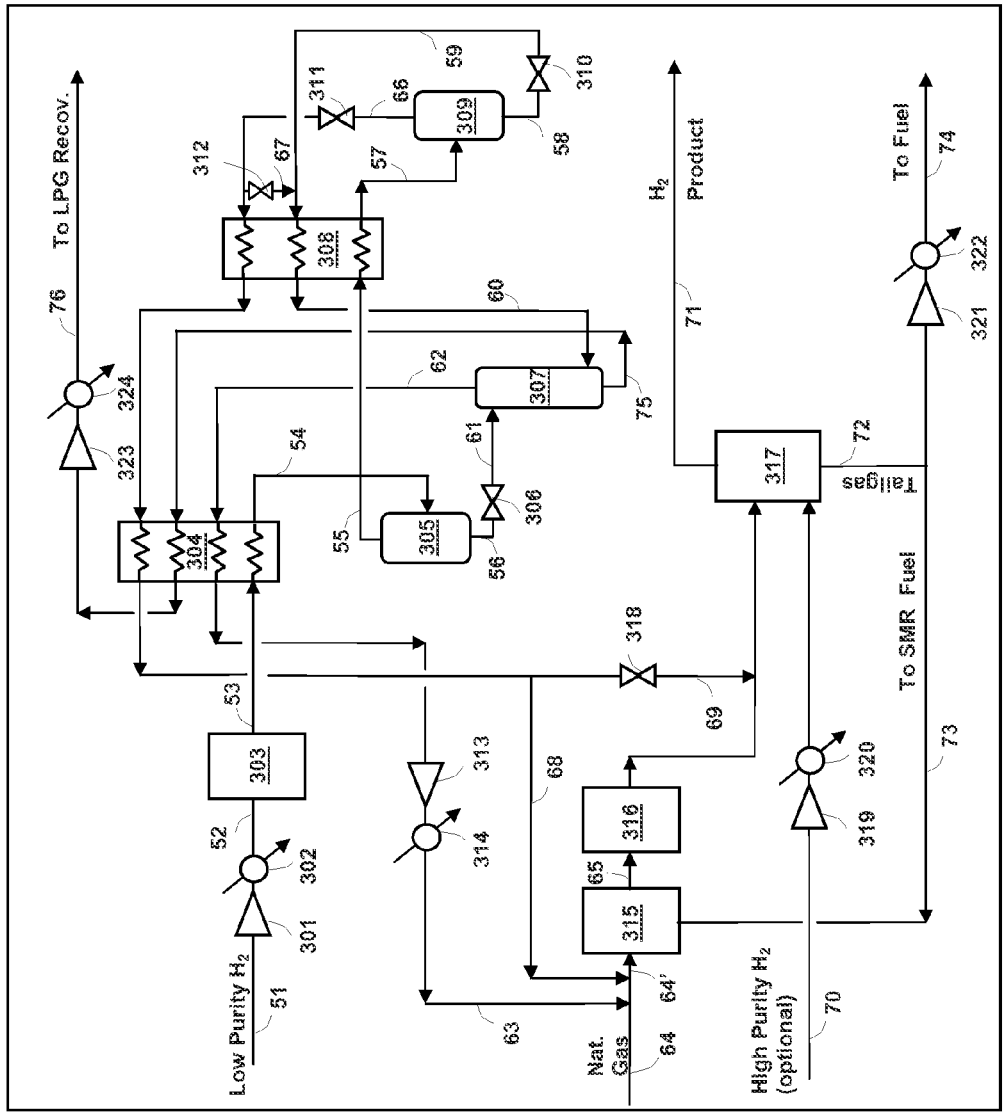
FIG. 3 is a schematic for an embodiment of the invention for the recovery of hydrogen, raw LPG and SMR feed.

Another embodiment of the present invention is a process for recovering high purity hydrogen and optionally one or more hydrocarbon-rich products from a feed gas containing less than 50 mole % hydrogen, as represented by FIGS. 2 and 3, comprising the following steps:

a) cooling a feed gas 21, 51 in one or more heat exchangers and producing a partially condensed feed gas 24, 54;

b) separating the partially condensed feed gas 24, 54 to form a hydrogen-enriched stream 25, 55 and a hydrocarbon-enriched stream 26, 56;

c) generating refrigeration by Joule-Thomson expansion of the hydrocarbon-enriched stream 26, 56 and forming a colder hydrocarbon-rich stream 34, 61;

d) further cooling the hydrogen-enriched stream 25, 55 to produce a partially condensed hydrogen-enriched stream 27, 57;

e) separating the partially condensed hydrogen-enriched stream 27, 57 into a hydrogen-rich stream 27, 66 and a hydrocarbon-rich stream 35, 58;

f) generating refrigeration by Joule-Thomson expansion of hydrogen-rich stream 28, 66 and hydrocarbon-rich stream 35, 58;

g) recovering refrigeration from hydrogen-rich stream 28, 66 to cool the hydrogen-enriched stream 25, 55 in step (d) and the feed gas 21, 51 in step (a);

h) recovering a gas stream 29, 69 containing at least 60 mole % hydrogen from the hydrogen-rich stream 28, 66;

i) feeding gas stream 29, 69 to a PSA system 219, 317 and recovering high purity hydrogen;

j) recovering refrigeration from cold hydrocarbon-rich stream 36, 59 to cool the hydrogen-enriched stream 25, 55 in step (d);

k) producing a recontacting stream 38, 60 from the partially condensed hydrogen-enriched stream 27, 57;

l) feeding the cold hydrocarbon-enriched stream 34, 61 and the recontacting stream 38, 60 to a wash column and producing a methane-rich vapor stream 39, 62 and a hydrocarbon-rich liquid stream 41, 75;

m) recovering refrigeration from the methane-rich vapor stream 39, 62 and compressing it to form methane-rich vapor product 40, 63; and n) recovering refrigeration from the hydrocarbon-rich liquid stream 41, 75 and compressing it to form raw LPG product 42, 76.

A third embodiment of the present invention is represented by FIG. 3 and comprises the steps set forth above and represented by FIG. 2, plus the additional step of processing methane-rich product 63 in a steam methane reforming process to produce hydrogen containing feed stream 69 to the PSA system 219, 317.

Process 1: Hydrogen Only (FIG. 1)

Referring to FIG. 1, a refinery gas 1 containing between 30-50 mole % hydrogen, at about 100° F. and 50-120 psia, is compressed in a multistage compressor 101, cooled to about 100° F. in compressor cooler 102, and sent through line 2 to a pretreatment system 103, comprising a drier and one or multiple adsorbing beds for impurities removal (e.g., $CO_2$, $H_2S$, $NH_3$, benzene, n-hexane, mercury). The treated gas is passed by line 3 through heat exchanger 104, where it is cooled to a temperature such that the stream is partially condensed and the vapor contains at least 60 mole % hydrogen. The partially condensed stream is fed by line 4 to separator 105, where it separates into a hydrogen-rich gas and a practically hydrogen-free condensate. The hydrogen-rich gas, containing at least 60 mole % hydrogen, leaves the separator 105 by line 5, is expanded if needed to PSA pressure in valve 106, then warmed to about 90° F. in heat exchanger 104, and fed through line 6 to pressure swing adsorption (PSA) system 107, operating at about 350 psia. Optionally, a high purity hydrogen stream containing 70-90 mole % hydrogen can be fed, together with hydrogen containing stream 6, to PSA system 107 through feed line 7 after compression, if required, in compressor 108 and cooling to about 100° F. in compressor cooler 109. A high pressure, high purity hydrogen gas, containing at least 99 mole % hydrogen, leaves the PSA through product line 8, and a low pressure tailgas (at about 20 psia) is rejected through line 9. The PSA tailgas, comprising methane, residual hydrogen, and other non-readily condensable compounds in lesser amounts (e.g., $N_2$, CO, $CO_2$) is sent to fuel through line 10, after recompression to the fuel header pressure (i.e., 50-120 psia) in compressor 110 and cooling to about 100° F. in compressor cooler 111. The hydrogen-free condensate containing methane and heavier hydrocarbons, leaves the separator 105 through line 11 and then passes through expansion valve 112, where it is pressure reduced to about 50-120 psia to generate refrigeration. The condensate is then returned to heat exchanger 104 through line 12, where it provides cooling for the incoming feed, and sent to fuel through line 13, after optional compression and cooling in compressor 113 and heat exchanger 114, respectively. A slip stream is taken through line 14 from the high pressure hydrogen-rich vapor 5 and passed through an expansion valve 115, allowing for temperature control in heat exchanger 104.

Example 1

Process scheme shown in FIG. 1 was modeled using a commercial process simulator for recovering high purity hydrogen from a refinery gas stream (for example, from a fuel gas header) containing 29.66 mole % hydrogen. The results are summarized in Table 1. The fuel gas header pressure is 80 psia and the PSA system operates at 350 psia. The feed 1 is compressed to a pressure slightly higher than the PSA pressure (about 360 psia), cooled to −194° F., and then separated in a hydrocarbon-rich liquid and a hydrogen-rich gas. The liquid is expanded to a pressure close to the fuel gas header pressure (82 psia), generating enough refrigeration to obtain a hydrogen-rich gas 6 containing 66.8 mole % hydrogen. The hydrogen-rich gas is then sent to the PSA system for purification. No recompression is required for the hydrocarbon-rich gas before sending it to fuel.

TABLE 1

| | Example 1 Simulation Results | | | | | | |
|---|---|---|---|---|---|---|---|
| Name | 1 | 4 | 6 | 8 | 9 | 12 | 13 |
| Temperature (F.) | 100 | −194.1 | 89.2 | 110 | 110 | −199.3 | 90.5 |

TABLE 1-continued

Example 1 Simulation Results

| Name | 1 | 4 | 6 | 8 | 9 | 12 | 13 |
|---|---|---|---|---|---|---|---|
| Pressure (psia) | 80 | 357 | 355 | 345 | 20 | 82 | 80 |
| Flow (MMSCFD) | 65 | 65 | 28.5 | 16 | 12.5 | 36.5 | 36.5 |
| Composition - Mole Fractions (Dry Basis) | | | | | | | |
| Hydrogen | 0.2966 | 0.2966 | 0.6678 | 0.9999 | 0.2434 | 0.0078 | 0.0078 |
| Methane | 0.3143 | 0.3143 | 0.2092 | 0.0000 | 0.4766 | 0.3961 | 0.3961 |
| Ethane | 0.1652 | 0.1652 | 0.0018 | 0 | 0.004 | 0.2924 | 0.2924 |
| Ethylene | 0.077 | 0.0770 | 0.0027 | 0 | 0.0061 | 0.1349 | 0.1349 |
| Propane | 0.0291 | 0.0291 | 0 | 0 | 0 | 0.0517 | 0.0517 |
| Propene | 0.031 | 0.0310 | 0 | 0 | 0.0001 | 0.0551 | 0.0551 |
| i-Butane | 0.0022 | 0.0022 | 0 | 0 | 0 | 0.0039 | 0.0039 |
| n-Butane | 0.0084 | 0.0084 | 0 | 0 | 0 | 0.0149 | 0.0149 |
| l-Butene | 0.0089 | 0.0089 | 0 | 0 | 0 | 0.0158 | 0.0158 |
| i-Pentane | 0.0025 | 0.0025 | 0 | 0 | 0 | 0.0044 | 0.0044 |
| n-Pentane | 0.0007 | 0.0007 | 0 | 0 | 0 | 0.0012 | 0.0012 |
| n-Hexane | 0.0003 | 0.0003 | 0 | 0 | 0 | 0.0005 | 0.0005 |
| Nitrogen | 0.0591 | 0.0591 | 0.1139 | 0.0001 | 0.2594 | 0.0165 | 0.0165 |
| Oxygen | 0.0034 | 0.0034 | 0.0043 | 0 | 0.0099 | 0.0027 | 0.0027 |
| CO | 0.0001 | 0.0001 | 0.0002 | 0.0000 | 0.0004 | 0. | 0 |
| CO2 | 0.0011 | 0.0011 | 0.0001 | 0.0000 | 0.0001 | 0.0019 | 0.0019 |

Process 2: Hydrogen, Raw LPG and Methane-Rich Gas (FIG. 2)

The partial condensation arrangement in FIG. 1 can be modified to account for hydrocarbon recovery. This arrangement is especially useful when both BTU removal and hydrogen recovery are of interest. Referring to FIG. 2, a refinery gas 21 containing between 30-50 mole % hydrogen, at about 100° F. and 50-120 psia, is compressed in a multistage compressor 201, cooled to about 100° F. in compressor cooler 202, and sent through line 22 to pretreatment system 203. The treated gas is passed by line 23 through heat exchanger 204, where it is cooled to an intermediate temperature between −40° F. to −120° F. and partially condensed, such that most of the C2+ hydrocarbons will be in the liquid phase. The partially condensed stream is fed by line 24 to separator 205, where it separates in a vapor containing mostly hydrogen and methane, and a condensate rich in C2+ hydrocarbons. The gas leaves the separator 205 by line 25, and is further cooled in heat exchanger 208 to a temperature between −170° F. and −230° F., such as the stream is partially condensed and the vapor contains at least 60 mole % hydrogen. The partially condensed stream is sent by line 27 to separator 209, where it separates in a hydrogen-rich gas and a methane-rich liquid. The hydrogen-rich gas leaves separator 209 by line 28, is expanded, if needed, to the pressure required by the PSA system in expansion valve 211, is warmed in heat exchangers 208 and 204 to about 90° F., and fed through line 29 to PSA system 219, operating at about 350 psia. An optional high purity hydrogen stream containing 70-90 mole % hydrogen can be fed, together with hydrogen-containing stream 29, to PSA system 219 through feed line 30 after compression, if required, in compressor 217 and cooling to about 100° F. in compressor cooler 218. A high pressure, high purity hydrogen gas, containing at least 99 mole % hydrogen, leaves the PSA through product line 31, and a low pressure tailgas (at about 20 psia) is rejected through line 32. The tailgas is sent to fuel through line 33, after recompression to the fuel header pressure (i.e., 50-120 psia) in compressor 220 and cooling to about 100° F. in compressor cooler 221. The C2+ rich liquid stream leaving separator 205 by line 26 and is expanded through valve 206, generating refrigeration, and then fed by line 34 to the top of wash column 207. The methane-rich condensate leaving separator 209 through line 35 is passing through an expansion valve 210, where it pressure reduced to about 50-120 psia, generating refrigeration, and then is returned to heat exchanger 208 through line 36, where it vaporizes providing cooling for the incoming stream. A slip stream is taken through line 37 from the high pressure hydrogen-rich vapor 28 and passed through an expansion valve 212 to the methane-rich stream 36, allowing for temperature control in heat exchanger 208. The vaporized stream is then fed by line 38 to the bottom of wash column 207, where it comes into contact with the C2+ rich liquid, thus maximizing the recovery of C2+ hydrocarbons in the liquid, as well as increasing the recovery of methane from the C2+ rich liquid. A methane-rich product containing between 70-95% methane, leaves column 207 by line 39, is warmed in heat exchanger 204 against incoming feed and, after optional compression in 215 and cooling in 216, is sent to fuel through line 40. The C2+ rich liquid, containing less than 10% methane, leaves column 207 by line 41, is warmed in heat exchanger 204 against incoming feed and, after optional compression and cooling in 213 and 214, respectively, is sent by line 42 to further processing for LPG recovery.

Example 2

The process scheme shown in FIG. 2 was modeled, using a commercial process simulator, for recovering high purity hydrogen, methane-rich gas and C2+ hydrocarbons from a refinery gas stream and the results are summarized in Table 2. The product quality targets for this case were a maximum 10% olefins in the methane-rich gas 40, less than 10% methane in the C2+ stream 42 and a minimum of 60 mole % hydrogen in the hydrogen-rich gas 28. To achieve the first two targets, the feed stream has to be cooled in the first step to about −100° F. Applying a minimum pressure differential over the Joule-Thomson valve, i.e., from the pressure required by PSA to the fuel gas header pressure (as in Example 1), will not generate enough refrigeration in the system, causing the warm end heat exchanger 204 to pinch. To avoid this, either the feed needs to be compressed to a higher pressure, or the condensates 26 and 35 to be expanded across the Joule-Thomson valves to a lower pressure. However, the latter will require recompression of the methane-rich gas before sending it to fuel, thus increasing capital costs. It is generally more economical to increase the pressure on the feed side, as this will have less impact on capital cost. In this case, to eliminate the pinch on heat exchanger 204, the feed needs to be compressed to 450 psia. The positive effect of the higher pressure differential is that a higher hydrogen purity is obtained for stream 28 (73%), which will have a positive effect on PSA recovery.

eous mixture leaving the reformer by line 65 is then sent to the water gas shift reactor 316 and then for purification to PSA system 317, operating at about 350 psia. The hydrogen-rich

TABLE 2

Example 2 Simulation Results

| Name | 21 | 26 | 25 | 35 | 28 | 29 | 31 | 33 | 40 | 42 |
|---|---|---|---|---|---|---|---|---|---|---|
| Temperature (° F.) | 100 | −100 | −100 | −220.9 | −220.9 | 90 | 110 | 110 | 78.82 | 90 |
| Pressure (psia) | 80 | 446.5 | 446.5 | 445 | 445 | 354 | 345 | 20 | 80 | 80 |
| Molar Flow (MMSCFD) | 65 | 22.45 | 42.55 | 16.92 | 25.63 | 25.61 | 15.77 | 9.834 | 20.66 | 18.74 |
| Composition - Mole Fractions (Dry Basis) | | | | | | | | | | |
| Hydrogen | 0.2966 | 0.01 | 0.4479 | 0.0156 | 0.7333 | 0.7333 | 0.9999 | 0.3055 | 0.0244 | 0.0001 |
| Methane | 0.3143 | 0.1956 | 0.377 | 0.7247 | 0.1475 | 0.1475 | 0.0000 | 0.384 | 0.7173 | 0.0982 |
| Ethane | 0.1652 | 0.3942 | 0.0444 | 0.1114 | 0.0002 | 0.0002 | 0 | 0.0006 | 0.1082 | 0.4535 |
| Ethylene | 0.0770 | 0.1543 | 0.0362 | 0.0901 | 0.0006 | 0.0006 | 0 | 0.0017 | 0.094 | 0.1626 |
| Propane | 0.0291 | 0.082 | 0.0012 | 0.003 | 0 | 0 | 0 | 0 | 0.0021 | 0.0987 |
| Propene | 0.0310 | 0.0866 | 0.0017 | 0.0043 | 0 | 0 | 0 | 0 | 0.0028 | 0.1044 |
| i-Butane | 0.0022 | 0.0063 | 0 | 0.0001 | 0 | 0 | 0 | 0 | 0 | 0.0076 |
| n-Butane | 0.0084 | 0.0242 | 0.0001 | 0.0002 | 0 | 0 | 0 | 0 | 0.0001 | 0.0291 |
| l-Butene | 0.0089 | 0.0256 | 0.0001 | 0.0002 | 0 | 0 | 0 | 0 | 0.0001 | 0.0308 |
| i-Pentane | 0.0025 | 0.0072 | 0 | 0 | 0 | 0 | 0 | 0 | 0 | 0.0087 |
| n-Pentane | 0.0007 | 0.002 | 0 | 0 | 0 | 0 | 0 | 0 | 0 | 0.0024 |
| n-Hexane | 0.0003 | 0.0009 | 0 | 0 | 0 | 0 | 0 | 0 | 0 | 0.001 |
| Nitrogen | 0.0591 | 0.008 | 0.086 | 0.0434 | 0.1142 | 0.1142 | 0.0001 | 0.2974 | 0.0437 | 0.0008 |
| Oxygen | 0.0034 | 0.0011 | 0.0046 | 0.0055 | 0.004 | 0.004 | 0 | 0.0104 | 0.0055 | 0.0003 |
| CO | 0.0001 | 0 | 0.0001 | 0.0001 | 0.0002 | 0.0002 | 0.0000 | 0.0004 | 0.0001 | 0 |
| CO2 | 0.0011 | 0.0019 | 0.0007 | 0.0016 | 0 | 0 | 0.0000 | 0 | 0.0017 | 0.0019 |

Process 3: Hydrogen, Raw LPG and SMR Feed (FIG. 3)

The methane-rich gas obtained as vapor product from the wash column can be used either as fuel (as in embodiment in FIG. 2), or as feed to a SMR. FIG. 3 shows such an integration where a methane-rich gas is blended with natural gas and fed to a SMR. Referring to FIG. 3, a refinery gas 51 containing between 30-50 mole % hydrogen, at about 100° F. and 50-120 psia, is compressed in a multistage compressor 301, cooled to about 100° F. in compressor cooler 302, and sent through line 52 to pretreatment system 303. The treated gas is passed by line 53 through heat exchanger 304, where it is cooled to an intermediate temperature between −40° F. to −120° F. and partially condensed, such as most of the ethylene will be in the liquid phase. The partially condensed stream is fed by line 54 to separator 305, where it separates in a vapor containing mostly hydrogen and methane, and a condensate rich in C2+ hydrocarbons. The gas leaves the separator 305 by line 55, and is further cooled in heat exchanger 308 to a temperature between −170° F. and −230° F., such as the stream is partially condensed and the vapor will contain at least 60 mole % hydrogen. The partially condensed stream is sent by line 57 to separator 309, where it separates in a methane-rich liquid and a hydrogen-rich gas. The methane-rich condensate leaving separator 309 through line 58 is passing through expansion valve 310, where it is pressure reduced to about 50-120 psia, generating refrigeration, and then is returned to heat exchanger 308 through line 59, where it vaporizes providing cooling for the incoming stream. The vaporized stream is then fed by line 60 to the bottom of wash column 307. The C2+ rich liquid stream leaving separator 305 by line 56 is expanded through valve 306, generating refrigeration, and then fed by line 61 to the top of wash column 307. A methane-rich product containing between 70-95% methane, leaves column 307 by line 62, is warmed in heat exchanger 304 against incoming feed and, after compression in 313 and cooling in 314, is sent through line 63 as feed for the steam methane reformer (SMR) 315, operating at about 450 psia. Natural gas is also added to the SMR feed through line 64, the ratio between the natural gas and the upgraded methane-rich gas depending on the olefin and nitrogen content of the refinery gas. The gaseous mixture leaving the reformer by line 65 is then sent to the water gas shift reactor 316 and then for purification to PSA system 317, operating at about 350 psia. The hydrogen-rich gas leaving separator 309 by line 66 is, if needed, expanded to the SMR pressure in expansion valve 311. A slip stream is taken through line 67 from the high pressure hydrogen-rich vapor 66 and passed through an expansion valve 312 to the low pressure condensate, allowing for temperature control in heat exchanger 308. After warming in heat exchangers 308 and 304 to about 90° F., a part of the high pressure hydrogen-rich stream is taken by line 68 to the SMR feed 64', to provide the hydrogen needs for the hydrotreating step of the SMR, and the rest is expanded to the PSA pressure in valve 318 and sent by line 69 to PSA system 317. Optionally, a high purity hydrogen stream containing 70-90 mole % hydrogen can be fed to PSA system 317 through feed line 70 after compression, if required, in compressor 319 and cooling to about 100° F. in compressor cooler 320. A high pressure, high purity hydrogen gas, containing at least 99 mole % hydrogen, leaves the PSA through product line 71, and a low pressure tailgas (at about 20 psia) is rejected through line 72. Part of the PSA tailgas is sent by line 73 back to the SMR where it is used as fuel, and the rest is, after recompression in compressor 321 and cooling to about 100° F. in compressor cooler 322, sent by line 74 to the main fuel system. The C2+ rich liquid, containing less than 10% methane, leaving column 307 by line 75, is warmed in heat exchanger 304 against incoming feed and, after optional compression in 323 and cooling in 324 is sent by line 76 to further processing for LPG recovery.

Example 3

Process scheme shown in FIG. 3 was modeled using a process simulator and the results are summarized in Table 3. For SMR integration, tighter constraints are applied on the ethylene and nitrogen contained in the methane-rich stream 63. It is desired that the SMR feed should not have more than 2% olefins and 2-3% nitrogen. Generally, there is a tradeoff between the amount of methane recovered in the methane-rich stream and its olefin content. In this case, the proposed process recovered 90% of the methane in the feed, with an olefin content low enough such as it could replace as much as 20% of a SMR feed producing 100 MMSCFD hydrogen. The hydrogen produced does not take into account the additional hydrogen recovered from the hydrogen-rich stream 69.

TABLE 3

Example 3 Simulation Results

| Name | 51 | 59 | 61 | 63 | 64 | 64' | 69 | 71 | 74 | 76 |
|---|---|---|---|---|---|---|---|---|---|---|
| Temperature (° F.) | 100 | −229.9 | −121.3 | 100.0 | 100.0 | 99.2 | 89.8 | 110 | 100 | 90 |
| Pressure (psia) | 80 | 83 | 81.5 | 450 | 80 | 450 | 355 | 345 | 80 | 80 |
| Molar Flow (MMSCFD) | 22 | 7.1 | 8.8 | 8.8 | 32.0 | 42.0 | 8.6 | 5.4 | 3.2 | 7.3 |
| Composition - Mole Fractions (Dry Basis) | | | | | | | | | | |
| Hydrogen | 0.2966 | 0.0156 | 0.0102 | 0.0315 | 0.0000 | 0.0297 | 0.7487 | 0.9999 | 0.3228 | 0.0001 |
| Methane | 0.3143 | 0.7205 | 0.1926 | 0.7019 | 0.9552 | 0.8770 | 0.1327 | 0.0000 | 0.3577 | 0.0958 |
| Ethane | 0.1652 | 0.1130 | 0.3947 | 0.1125 | 0.0130 | 0.0333 | 0.0002 | 0 | 0.0005 | 0.4531 |
| Ethylene | 0.0770 | 0.0900 | 0.1534 | 0.0958 | 0.0000 | 0.0200 | 0.0006 | 0 | 0.0015 | 0.1585 |
| Propane | 0.0291 | 0.0032 | 0.0830 | 0.0022 | 0.0038 | 0.0034 | 0.0000 | 0 | 0.0000 | 0.1010 |
| Propene | 0.0310 | 0.0045 | 0.0876 | 0.0030 | 0.0000 | 0.0006 | 0.0000 | 0 | 0.0000 | 0.1068 |
| i-Butane | 0.0022 | 0.0001 | 0.0064 | 0.0000 | 0.0004 | 0.0003 | 0.0000 | 0 | 0.0000 | 0.0078 |
| n-Butane | 0.0084 | 0.0002 | 0.0246 | 0.0001 | 0.0005 | 0.0004 | 0.0000 | 0 | 0.0000 | 0.0298 |
| l-Butene | 0.0089 | 0.0002 | 0.0260 | 0.0001 | 0.0000 | 0.0000 | 0.0000 | 0 | 0.0000 | 0.0316 |
| i-Pentane | 0.0025 | 0.0000 | 0.0073 | 0.0000 | 0.0002 | 0.0002 | 0.0000 | 0 | 0.0000 | 0.0089 |
| n-Pentane | 0.0007 | 0.0000 | 0.0021 | 0.0000 | 0.0001 | 0.0001 | 0.0000 | 0 | 0.0000 | 0.0025 |
| n-Hexane | 0.0003 | 0.0000 | 0.0009 | 0.0000 | 0.0001 | 0.0001 | 0.0000 | 0 | 0.0000 | 0.0011 |
| Nitrogen | 0.0591 | 0.0454 | 0.0080 | 0.0456 | 0.0090 | 0.0199 | 0.1139 | 0.0001 | 0.3068 | 0.0008 |
| Oxygen | 0.0034 | 0.0056 | 0.0011 | 0.0055 | 0.0000 | 0.0013 | 0.0038 | 0 | 0.0103 | 0.0003 |
| CO | 0.0001 | 0.0001 | 0.0000 | 0.0001 | 0.0000 | 0.0000 | 0.0002 | 0.0000 | 0.0005 | 0.0000 |
| CO2 | 0.0011 | 0.0016 | 0.0019 | 0.0017 | 0.0177 | 0.0138 | 0.0000 | 0.0000 | 0.0000 | 0.0018 |

Although the invention has been described in detail with reference to certain preferred embodiments, those skilled in the art will recognize that there are other embodiments within the spirit and the scope of the claims.

What is claimed is:

1. A process for recovering high purity hydrogen from a feed gas containing less than 50 mole % hydrogen comprising the steps of:
    a) cooling a feed gas in one or more heat exchangers and producing a partially condensed feed gas;
    b) separating the partially condensed feed gas to produce a hydrogen-rich stream and a hydrocarbon-rich stream;
    c) generating refrigeration by Joule-Thomson expansion of the hydrocarbon-rich stream and producing a colder hydrocarbon-rich stream;
    d) recovering refrigeration from the colder hydrocarbon-rich stream to cool the feed gas in step (a);
    e) recovering refrigeration from the hydrogen-rich stream to cool the feed gas in step (a);
    f) recovering a gas stream containing at least 60 mole % hydrogen from the hydrogen-rich stream; and
    g) feeding the gas stream containing at least 60 mole % hydrogen to a pressure swing adsorption (PSA) system and recovering high purity hydrogen product with or without feeding an external hydrogen-containing stream to the PSA system.

2. The process of claim 1, wherein in step (g), a low pressure tailgas comprising methane, residual hydrogen and other non-readily condensable compounds leaves the PSA system.

3. The process of claim 1, wherein the feed gas contains between 30-50 mole % hydrogen.

4. The process of claim 3, wherein the feed gas is at a temperature of about 100° F. and 50-120 psia.

5. The process of claim 1, wherein the high purity hydrogen product contains at least 99 mole % hydrogen.

* * * * *